(12) United States Patent
Lemieux

(10) Patent No.: US 7,018,005 B2
(45) Date of Patent: Mar. 28, 2006

(54) VEHICLE TRACK PROVIDING ENHANCED STEERABILITY

(75) Inventor: René Lemieux, Granby (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 10/635,451

(22) Filed: Aug. 7, 2003

(65) Prior Publication Data

US 2004/0026995 A1 Feb. 12, 2004

Related U.S. Application Data

(60) Provisional application No. 60/401,770, filed on Aug. 8, 2002.

(51) Int. Cl.
*B62D 55/24* (2006.01)

(52) U.S. Cl. ........................................ 305/178; 305/165
(58) Field of Classification Search ................ 305/160, 305/165, 166, 178, 179, 184
See application file for complete search history.

(56) References Cited

U.S. PATENT DOCUMENTS

| | | | | | |
|---|---|---|---|---|---|
| 2,067,400 | A | * | 1/1937 | Koplin et al. | 474/238 |
| 2,531,111 | A | * | 11/1950 | Daniels | 305/184 |
| 3,464,743 | A | * | 9/1969 | Hallaman | 305/170 |
| 3,694,040 | A | * | 9/1972 | Hallaman | 305/179 |
| 3,754,798 | A | * | 8/1973 | Chaumont | 305/166 |
| 3,779,617 | A | * | 12/1973 | Palmaer | 305/179 |
| 3,930,689 | A | * | 1/1976 | Maki | 305/180 |
| 4,279,449 | A | * | 7/1981 | Martin et al. | 305/178 |
| 4,938,546 | A | * | 7/1990 | Simmons | 305/180 |
| 4,991,911 | A | | 2/1991 | Blais | |
| 5,130,510 | A | | 7/1992 | Zeigler et al. | |
| D389,435 | S | | 1/1998 | Dandurand | |
| 5,709,440 | A | | 1/1998 | Lecours | |
| 5,713,645 | A | | 2/1998 | Thompson et al. | |
| 5,722,745 | A | | 3/1998 | Courtemanche et al. | |
| 5,730,510 | A | | 3/1998 | Courtemanche | |
| D408,326 | S | | 4/1999 | Dandurand | |
| 6,109,705 | A | | 8/2000 | Courtemanche | |
| 6,112,840 | A | * | 9/2000 | Forbes | 180/193 |
| 6,322,172 | B1 | | 11/2001 | Lussier | |
| 6,510,913 | B1 | | 1/2003 | Morin et al. | |
| 6,575,540 | B1 | | 6/2003 | Soucy et al. | |

* cited by examiner

*Primary Examiner*—Russell D. Stormer
(74) *Attorney, Agent, or Firm*—BRP Legal Services

(57) ABSTRACT

A vehicle track includes an endless belt. A plurality of laterally-elongated propulsive lugs and longitudinally-elongated turning lugs extend outwardly from an outer side of the endless belt. The propulsive lugs provide substantially longitudinally facing surfaces that dig into the snow to give the vehicle track propulsion and braking traction. However, the gripping force of the propulsive lugs impedes the longitudinally-elongated track's ability to pivot about a generally vertical axis as the tracked vehicle turns. The turning lugs include longitudinally-elongated side surfaces that substantially face in the lateral direction of the track. When the tracked vehicle is steered, the turning lugs form laterally-facing ramps that push the track upwardly away from the snow in response to lateral forces exerted by the snow on the turning lugs. The resulting upward track movement partially disengages the propulsion and turning lugs from the snow to enhance the track's steerability.

24 Claims, 12 Drawing Sheets

VEHICLE TRACK PROVIDING ENHANCED STEERABILITY

CROSS-REFERENCE TO RELATED APPLICATION(S)

This application claims the benefit of priority to U.S. Provisional Application No. 60/401,770, titled "VEHICLE TRACK PROVIDING ENHANCED STABILITY," filed Aug. 8, 2002, which is incorporated by reference herein in its entirety.

BACKGROUND OF THE INVENTION

1. Field of the Invention

The present invention relates to the construction of a vehicle track. More specifically, the present invention concerns the construction of the lugs or ribs on an endless track for tracked vehicles such as snowmobiles.

2. Description of Related Art

The basic platform for a conventional snowmobile includes a chassis that has at least three basic components: (1) a tunnel at the rear of snowmobile, (2) an engine cradle connected at the front of the tunnel, and (3) a front suspension connected beneath the engine cradle. The three components are connected together to form a unitary structure that is rigid enough to withstand the forces impingent thereupon during operation of the snowmobile.

In the conventional snowmobile, the tunnel is an inverted, U-shaped structural member that is disposed above an endless track, which propels the vehicle by engaging the ground or snow beneath the vehicle. The engine cradle is the structural portion of the chassis that extends forwardly from the tunnel and supports the engine at the front of the vehicle. The front suspension is a part of the engine cradle located beside and beneath the engine cradle. Steering skis (usually two) are suspended from the front suspension and engage the terrain beneath the vehicle. Shock absorbers, operatively disposed between the skis and the chassis, dampen the forces encountered by the skis as the vehicle travels over either groomed or rough terrain. The endless track is usually suspended beneath the tunnel via a structure called the "rear suspension." The rear suspension connects to the tunnel via one or more shock absorbers to dampen the forces that impinge upon the endless track as the vehicle travels over the ground.

Snow groomers are tracked vehicles typically used to groom the snow on ski slopes at winter resort areas. The platform for conventional snow groomers usually includes a number of elements such as: (1) a frame, (2) two endless tracks disposed on either lateral side of the frame, (3) an engine mounted on the frame, operatively connected to the two endless tracks, and (4) a cabin mounted on the frame to house one or more persons therein.

The endless tracks of the snow groomer typically are threaded around several wheels suspended on either lateral side of the frame. Typically, the endless tracks are hydraulically connected to the engine such that the endless tracks may be controlled independently. When equal amounts of motive power are applied to both tracks simultaneously, the snow groomer moves in a straight line. When differing amounts of motive power are applied to the two endless tracks a the same time, one track overpowers the other to steer the snow groomer (in the same manner that a military tank is steered).

Whether discussing a snowmobile, a snow groomer, or any other type of vehicle that relies on an endless track for propulsion, tracked vehicles drivingly engage the ground through the one or more endless tracks provided thereon. Endless tracks conventionally include an inner side that is engagable with the propulsion system of the vehicle. Conventional tracks also include an outer side with a pattern of projecting lugs or ribs that are designed to engage the snow or other ground surface, apply traction, and propel (or brake) the vehicle.

The prior art is replete with examples of endless tracks. In fact, a number of patents address some of the different ways in which the traction characteristics of endless tracks may be improved. U.S. Pat. Nos. 4,991,911, 5,722,745, and 6,109,705 provide three such examples.

Regardless of the vehicles on which endless tracks are provided, endless tracks must provide two types of traction: propulsive traction and braking traction. Propulsive traction pushes the vehicle forward while braking traction slows or stops the vehicle. In some cases, the track may be operated in a direction opposite to that required for propulsion. If so, the braking traction is characterized as a reverse propulsive traction. During propulsion, a forward face of the lugs engages the ground or the snow. Conversely, during braking, a rearward face of the lugs engages the ground or snow.

A common example of a conventional snowmobile track includes a plurality of lugs that are rectangularly-shaped (whether viewed from a top plan view or front or rear elevational view). When configured in this manner, the lugs provide the same traction whether they engage the ground or snow in a propulsive or in a braking fashion. Moreover, in the simple, traditional example, the lugs are disposed laterally across the endless track. So disposed, the lugs are positioned perpendicularly to the travel direction of the endless track.

Other snowmobile tracks are also known in the prior art. For example, U.S. Pat. No. 5,713,645 discloses an endless track with a plurality of V-shaped lugs with the points of the lugs directed rearwardly (or opposite to the forward travel direction of the endless track). The lugs provide propulsive traction because the open part of the V-shape (the forward face) forms a cup that grabs snow when the endless track pushes the snowmobile forward. While this improves the propulsive traction of the endless track, braking traction is sacrificed. When the vehicle brakes (or is operated in reverse), the rearward, pointed face of the V-shape diminishes traction because it does not present a cup-shaped surface to "scoop" at the ground or snow.

As would be appreciated by those skilled in the art, the V-shaped lug provides more traction when operating in a propulsive fashion than a laterally-oriented, flat lug. Conversely, the V-shaped lug provides less traction when operated in a braking fashion (or in reverse) than the simple, laterally-oriented, rectangular lug.

As would be appreciated by those skilled in the art, the same characteristics that help a vehicle track gain traction by digging into the snow inhibit the track's ability to turn. This is because the longitudinal portion of the track that is in contact with the snow is typically very long (e.g., 1 to 2 meters). The lugs are disposed in a pattern over the length of the track. Since the lugs are largely inflexible in the lateral direction, the vehicle's operator must exert a significant steering force to push the lugs sideways through the snow to turn the track.

Because a conventional endless track for a snowmobile inhibits turning, a need has arisen for an endless track that does not do so. The prior art to date, however, has failed to provide such a track.

SUMMARY OF THE INVENTION

Accordingly, one aspect of embodiments of the present invention provides an improved endless track with improved braking, propulsive, and reverse traction.

An additional aspect of embodiments of the present invention provides a more maneuverable vehicle track that is designed to turn easily as the operator steers the vehicle.

A further aspect of embodiments of the present invention provides a snowmobile track with one or more longitudinally extending lugs.

A further aspect of embodiments of the present invention provides a vehicle track with an endless flexible belt having an outer side and an opposed inner side. The endless flexible belt is engagable with a propulsion system of a vehicle. The track includes at least one laterally-elongated propulsive lug projecting from the outer side of the endless belt to provide propulsive and braking traction for the vehicle track. The endless track further includes at least one longitudinally-elongated turning lug projecting from the outer side of the endless belt. The turning lug has a longitudinally-elongated side surface that facilitates turning of the vehicle track when subjected to a lateral load.

According to an embodiment of the invention, the side surface of the turning lug may be disposed at an outer lateral portion the endless flexible belt and may be aligned with an outer lateral edge of the endless flexible belt. The side surface facilitates turning of the vehicle track by urging the vehicle track upwardly away from a ground when subjected to a lateral load. The side surface may be generally planar and may angle toward a center of the track.

According to another embodiment of the invention, the side surface of the at least one turning lug defines a side surface axis that may be disposed at an angle of less than 90 degrees from the outer side of the endless belt. Alternatively, the angle may be less than 80 degrees, less than 70 degrees, or less than 60 degrees, as desired.

The turning lug may be constructed from a flexible material such that, when a lateral load is applied to the turning lug, the turning lug flexes laterally.

In another embodiment of the invention, the side surface of the turning lug may define a lug axis that forms an angle of less than 45 degrees with a longitudinal direction of the endless belt. As needed or desired, the angle may also be less than 40 degrees, less than 35 degrees, less than 30 degrees, less than 25 degrees, less than 20 degrees, less than 15 degrees, less than 10 degrees, or less than 5 degrees.

In still another embodiment, the propulsive lug may be connected to the turning lug. The propulsive lug may comprise a flexible material. Alternatively, the propulsive lug and the turning lug may be integrally formed. In addition, the propulsive lug and the turning lug may be disposed with respect to one another such that they generally form a T shape, an L, shape, a C shape, or an H shape, among others.

The at least one turning lug may be a plurality of turning lugs that are longitudinally spaced from each other over the longitudinal length of the outer side of the endless flexible belt.

Still other aspects of the invention provide embodiments where the turning lug may include first and second sets of turning lugs. Each of the sets includes a plurality of turning lugs that are longitudinally spaced from each other over a longitudinal length of the endless flexible belt. First and second sets of turning lugs are laterally offset from each other and may be disposed on opposite lateral sides of the endless flexible belt from each other.

In one embodiment of the present invention, a longitudinal length of the side surface of the at least one turning lug may be greater than 2 centimeters, may be greater than 3 centimeters, may be greater than 5 centimeters, and may be greater than 10 centimeters. The longitudinal length of the side surface of the at least one turning lug may be at least twice as large as a lateral length of the side surface of the at least one turning lug.

The side surface of the at least one turning lug may be at least substantially parallel to a longitudinal direction of the vehicle track.

In another embodiment of the invention, the vehicle track may include at least one post projecting from the outer side of the endless belt. The propulsive lug may be connected at opposite lateral ends thereof to the at least one turning lug and the at least one post, respectively. The at least one propulsive lug and the at least one post may resist longitudinal bending to a greater extent than the at least one propulsive lug. The lateral ends of the at least one propulsion lug may resist longitudinal bending to a greater extent than an outer central portion of the at least one propulsive lug. When subjected to a longitudinal load, the outer central portion of the at least one propulsion lug forms a cup shape that bulges away from the longitudinal load. Depending on its orientation, the cup shape formed by the propulsive lug scoops snow when the vehicle track moves in either of its forward and reverse directions.

The propulsive lug may be laterally aligned with other lugs to form a row of propulsive lugs. In one embodiment, each of the rows of propulsive lugs tapers in a lateral direction as it extends away from the outer side of the endless belt. The row of propulsive lugs is positioned laterally adjacent to the turning lug. When a lateral load is applied to the turning lug, the lug bends laterally toward the row of propulsive lugs, thereby bending successive lugs until adjacent side surfaces of the lugs contact each other to form a solid wall that resists further lateral deformation.

In still another embodiment, the endless track may be constructed so that the hardness of the flexible belt varies from one lateral edge to the other.

In such an example, the propulsive lugs are softer than turning lugs. For example, the propulsive lugs may be constructed form a material with a Shore A hardness of between about 40 and 60, with a preferred hardness of about 50. In addition, the turning lugs may be constructed from a material with a Shore A hardness of between about 70 and 90, with a preferred hardness of about 80.

Embodiments of the present invention are also directed toward a snowmobile that includes any of the embodiment of the above-described vehicle track.

Additional or alternative objects, features, aspects, and advantages of the present invention will become apparent from the following description, the accompanying drawings, and the appended claims.

DESCRIPTION OF THE DRAWINGS

For a better understanding of the present invention as well as other objects and further features thereof, reference is made to the following description which is to be used in conjunction with the accompanying drawings, where.

DETAILED DESCRIPTION OF PREFERRED EMBODIMENTS

While the present invention is described in connection with a snowmobile 10, it is noted that the invention is not limited solely to snowmobiles. To the contrary, the present invention is intended for use with any other type of tracked vehicle such as a snow groomer, tank, military troop transport, or all terrain vehicle ("ATV") with multiple endless tracks installed in the place of tires. As would be appreciated by those skilled in the art, the present invention finds wide applicability to tracked vehicles in general.

Figure 1:
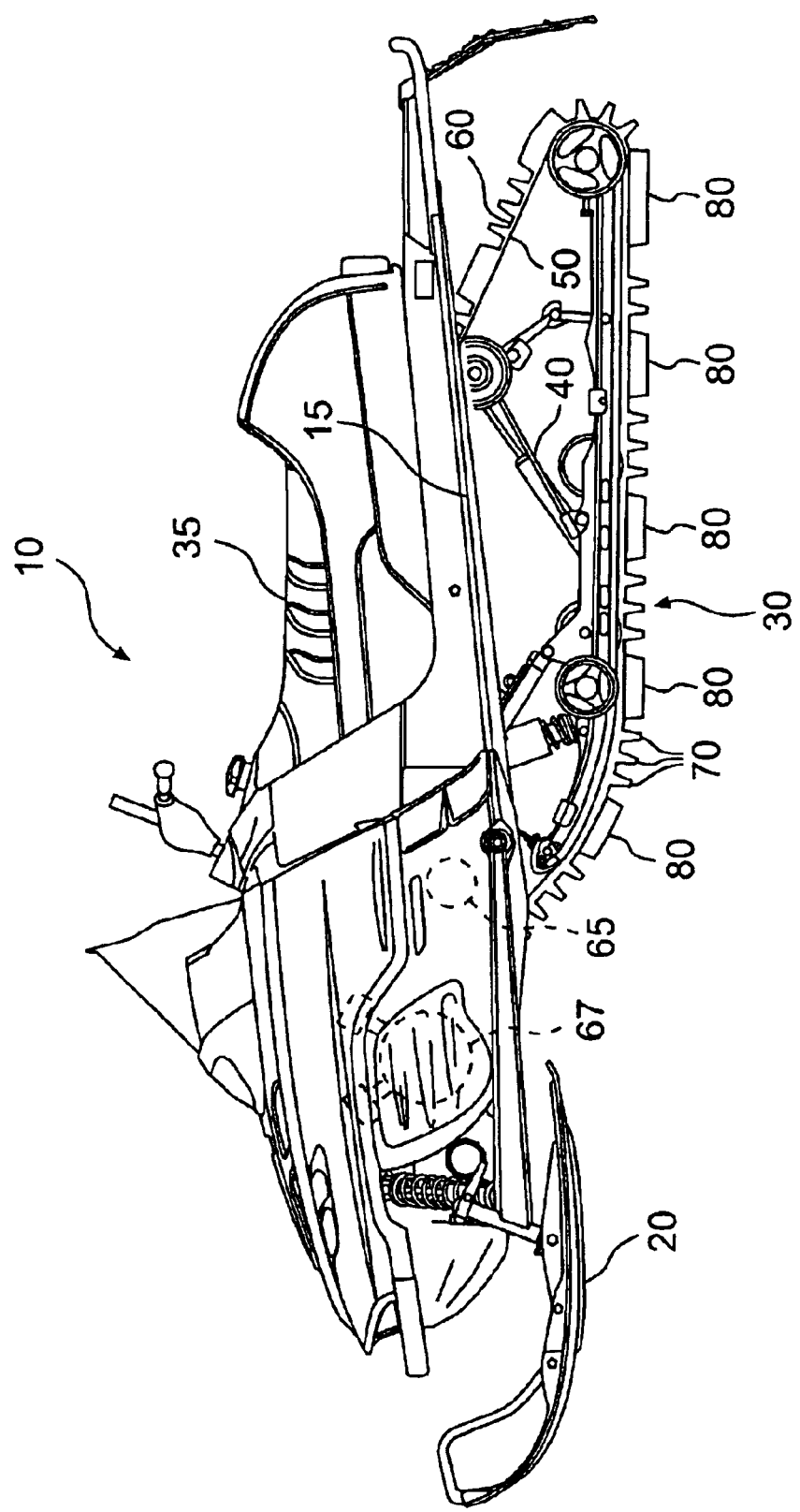
FIG. 1 is a side view of a snowmobile according to an embodiment of the present invention.

As illustrated in FIG. 1, the snowmobile 10 includes a chassis with a frame 15 that supports a pair of selectively steerable skis 20, an endless track 30, and a straddle-type seat 35. The endless track 30 comprises an endless flexible belt that acts as a ground-engaging loop beneath a slide suspension system 40 supported by the frame 15. The endless flexible belt 30 includes an inner side 50 and an outer side 60. A forward portion of the belt 30 passes around a drive sprocket 65 (shown in phantom) that is operatively connected to a propulsion system 67 (shown in phantom). The propulsion system 67 may be, for example, an internal combustion engine, a hydraulic motor, etc. The drive sprocket 65 and the inner side 50 include features (e.g., protrusions, dimples, teeth, cleats, etc.) that help the sprocket 65 and belt 30 engage one another. The sprocket 65 transfers propulsive and braking forces to the belt 30 from the propulsion system 67 and the brakes (not shown).

In the description of the invention that follows, the directions "forward," "rearward," "left," and "right" are defined according to the normal travel direction of the snowmobile 10, unless otherwise indicated. When referring to the endless flexible belt 30, the terms "forward" and "rearward" refer to the normal travel direction of the endless flexible belt 30 when the snowmobile 10 is moving forward or in reverse. It is noted, however, that the forward travel direction of the portion of the endless flexible belt 30 that contacts the snow is toward the rearward end of the snowmobile 10. Similarly, the rearward travel direction of the snow-contacting portion of the endless flexible belt 30 is toward the front of the snowmobile 10.

In addition, when referring to the propulsive or braking traction exerted by one or more of the lugs, these terms also are meant to encompass the propulsive traction created when the vehicle is operated in reverse.

Figure 2A:
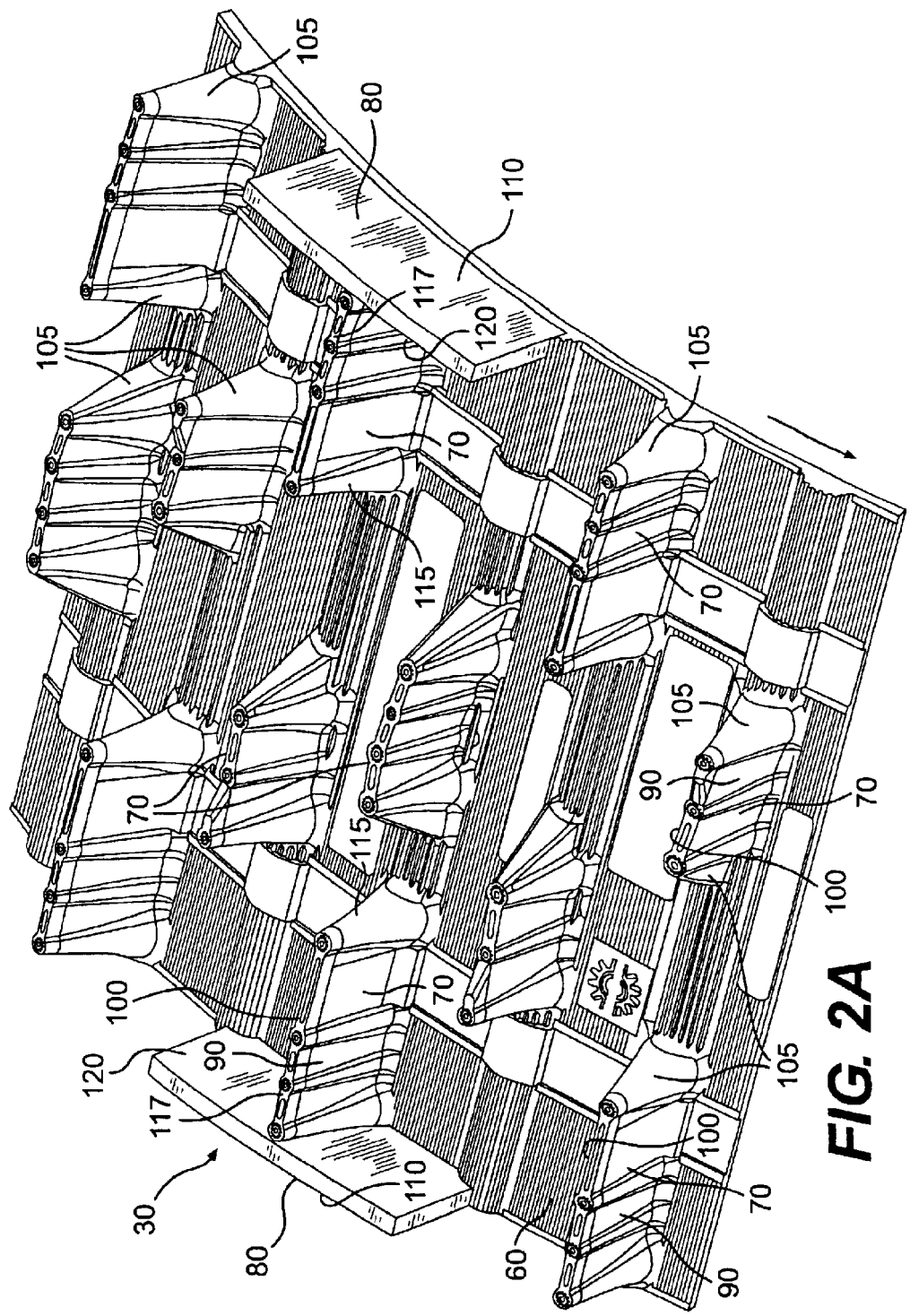
FIG. 2A is a partial perspective view, taken from the bottom, left, rearward side, of a vehicle track of the snowmobile illustrated in FIG. 1.
Figure 3:
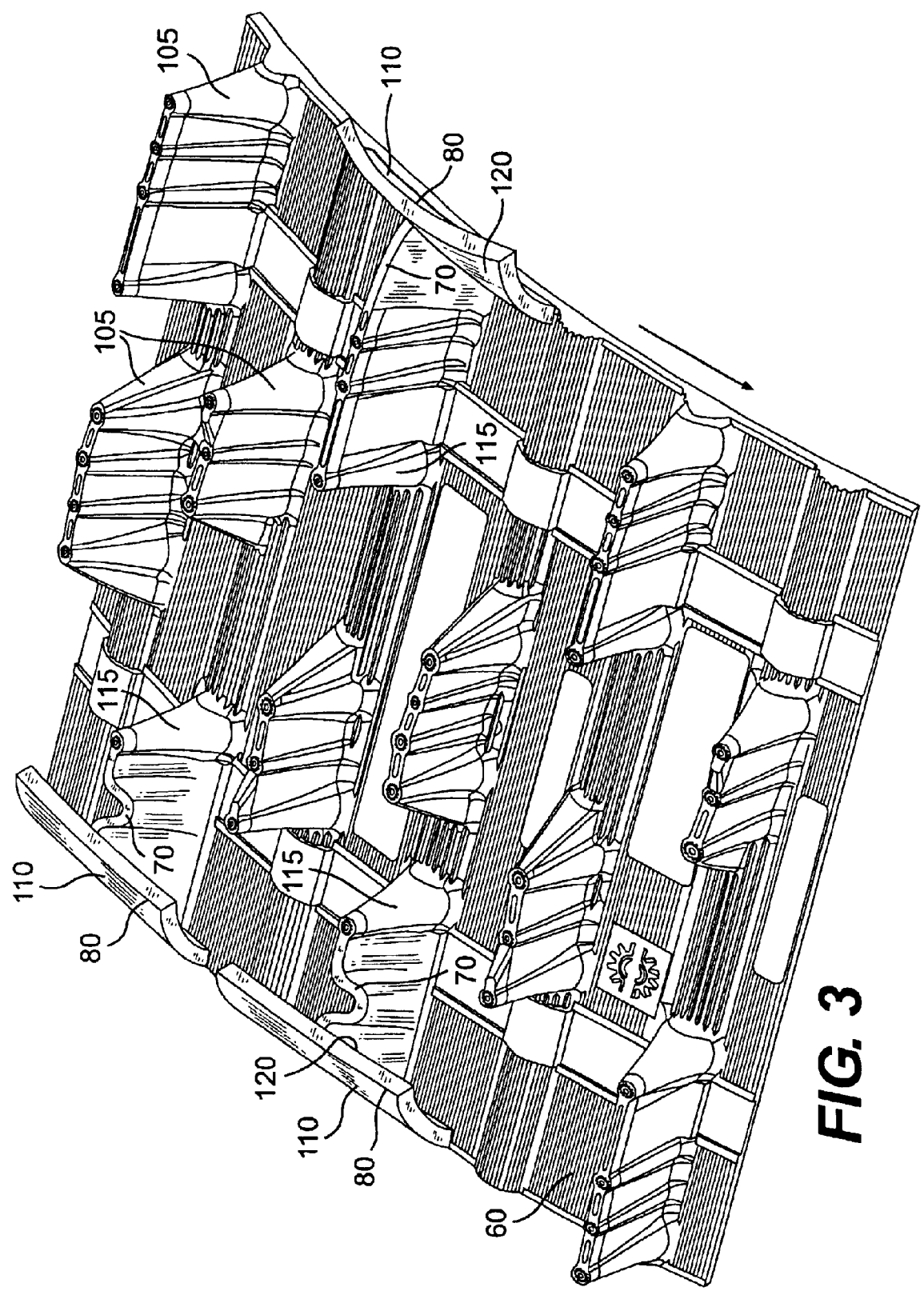
FIG. 3 is a partial perspective view, taken from the bottom, left, rearward side, of the vehicle track illustrated in FIGS. 2A–2C when the track is subjected to a lateral load.

As best illustrated in FIGS. 2A and 3, the track 30 includes a plurality of propulsive lugs 70 and turning lugs 80 that extend outwardly from the outer side 60 of the track 30. As discussed in greater detail below, the propulsive lugs 70 provide propulsive, reverse, and braking traction. The turning lugs 80 facilitate pivoting of the track 30, about a generally vertical axis, when the snowmobile 10 turns.

As illustrated in FIGS. 1 and 2A, the propulsive lugs 70 enable the track 30 to effectively transfer propulsive, braking, and reverse-propulsive forces to the snow beneath the snowmobile 10 by grabbing or digging into the snow. As best illustrated in FIG. 2A, the propulsive lugs 70 extend in a lateral direction of the track 30 (i.e., in a direction perpendicular to the longitudinal direction of the track 30). However, it is contemplated that a variety of alternatively shaped or oriented propulsive lugs may also be used. For example, as discussed above, U.S. Pat. No. 5,713,645 discloses propulsive lugs (or ribs) that extend at up to a 45 degree angle with respect to the lateral direction of the track as viewed from below. The propulsive lugs 70 preferably comprise a flexible, resilient material such as rubber reinforced with metal and/or fabric.

As illustrated in FIG. 2A, the track 30 moves in the direction of the arrow shown when the snowmobile 10 is moving forward. Because the propulsive lugs 70 are laterally elongated, they include forward and rearward faces 90, 100, respectively. When the snowmobile 10 is propelled forward, the large area of the forward faces 90 engages the snow to provide propulsive traction. Conversely, when the snowmobile 10 brakes or moves in reverse, the large area of the rearward faces 100 engages the snow to provide braking or reverse propulsive traction.

As illustrated in FIGS. 2A and 3, lateral ends 105 of the propulsive lugs 70 are preferably laterally tapered so that the propulsive lugs 70 have a trapezoidal shape. As is discussed in greater detail below, the tapered lateral ends 105 help the track 30 pivot during steering.

Turning lugs 80 are also provided on the track 30. The turning lugs 80 are elongated in a longitudinal direction of the track 30 and project from the outer side 60 of the track 30. Accordingly, the turning lugs 80 include side surfaces 110 that present a substantially-sized, planar area perpendicularly to the lateral direction of the track 30.

The side surfaces 110 preferably extend straight away from the outer side 60 of the track 30. However, the turning lugs 80 may alternatively project outwardly from the outer side 60 at acute or obtuse angles (see, e.g., the embodiment illustrated in FIG. 8) so that the side surfaces also project at a non-perpendicular angle to the outer side 60. The turning lugs 80 may have generally constant thicknesses (as shown in FIG. 2A) or may taper as they project from the outer side 60 (see, e.g., the embodiment illustrated in FIG. 8).

The side surfaces 10 are preferably generally planar. Alternatively, the side surfaces 110 may alternatively take on a variety of other shapes that may include convex, concave, bumped, angled, semi-cylindrical, irregular, etc.

In the embodiment illustrated in FIG. 2A, the side surfaces 110 are aligned with the outer lateral edges of the track 30. However, the turning lugs 80 may alternatively be positioned at any of a number of locations on the track 30 without deviating from the scope of the present invention (see, e.g., the embodiments illustrated in FIG. 6). Moreover, the turning lugs 80 may include laterally extending components such that the surfaces 110 are skewed relative to the longitudinal direction of the track 30.

The endless track 30 further includes a plurality of posts 115 that project outwardly from the outer side 60 of the endless track 30. Certain ones of the propulsive lugs 70 are connected at one lateral end to a middle longitudinal section of one of the turning lugs 80 and at an opposite lateral end to one of the posts 115. Accordingly, in this embodiment, each set of connected propulsive and turning lugs 70, 80 form a T shape. Each post 115 is conically shaped so that it is stiffer than its associated propulsive lug 70 and resists both lateral and longitudinal bending. Instead of being conically shaped, each post 115 could extend straight outwardly from the endless belt 30 and include a reinforcing metal rod therein. Furthermore, each post 115 could alternatively comprise a bolt or other metal rod that projects outwardly from the surface of the track 30.

Figure 2B:
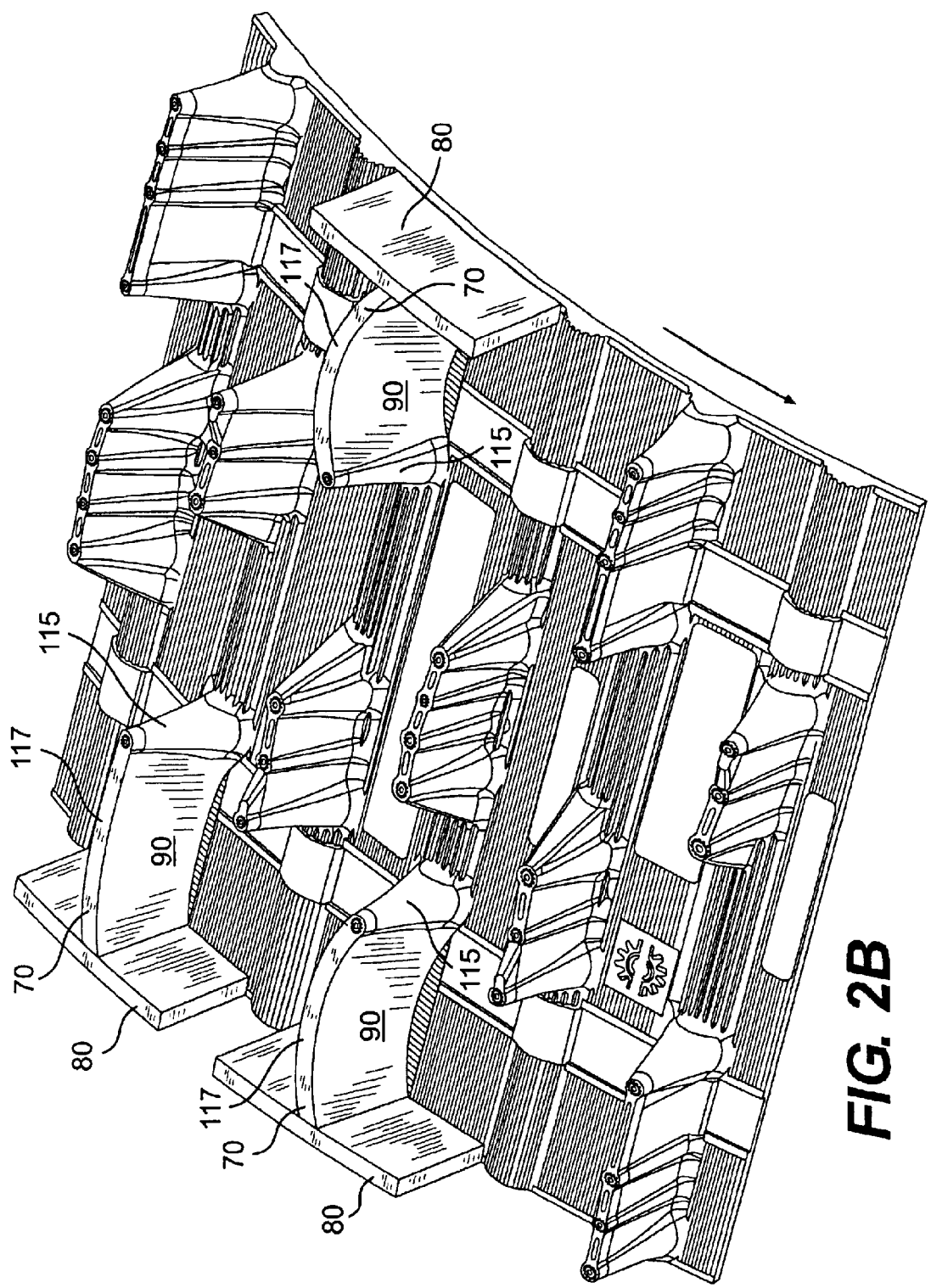
FIG. 2B is a partial perspective view, taken from the bottom, left, rearward side, of the vehicle track illustrated in FIG. 2 when the vehicle track is moving forward.
Figure 2C:
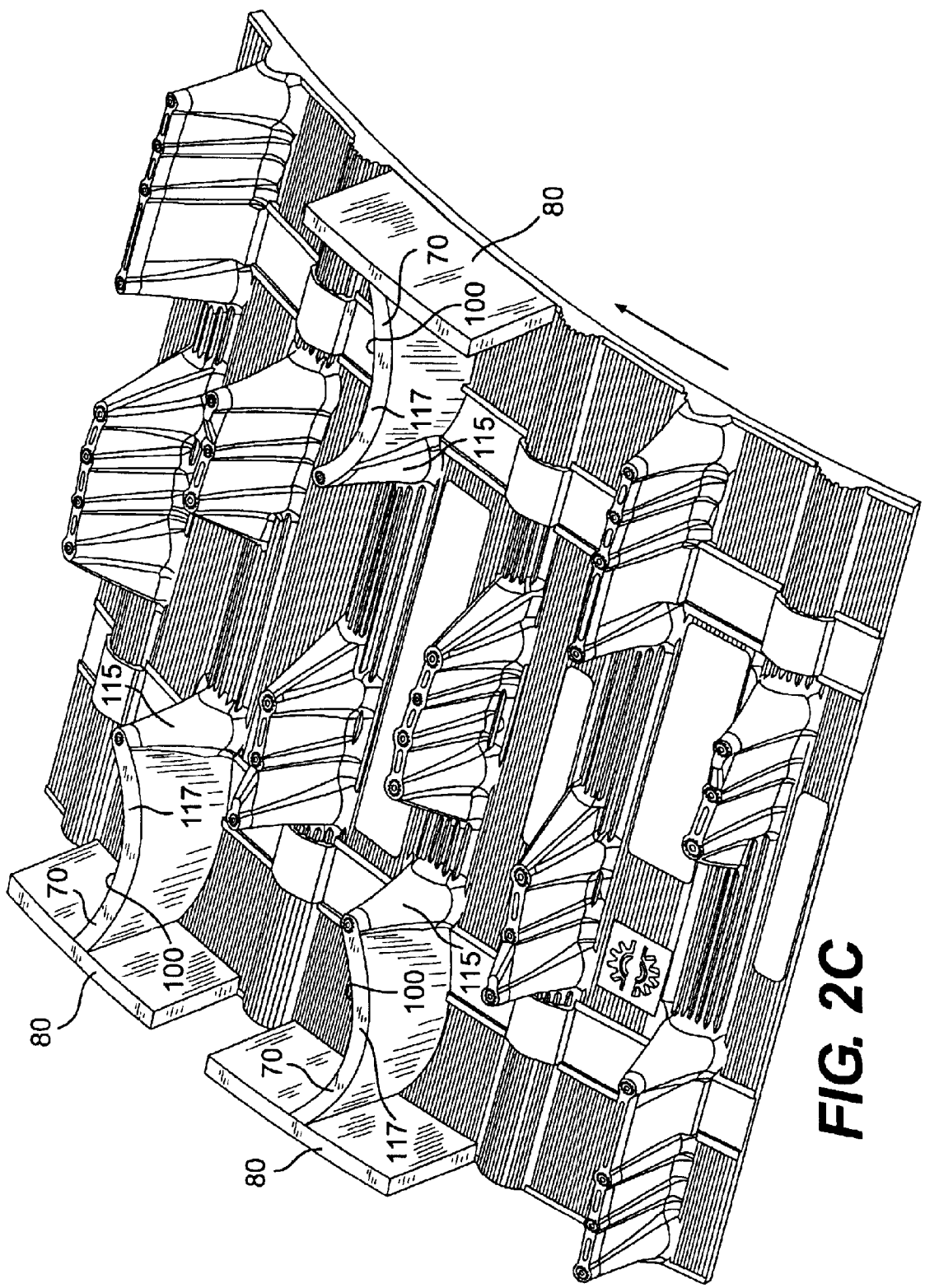
FIG. 2C is a partial perspective view, taken from the bottom, left, rearward side, of the vehicle track illustrated in FIG. 2 when the vehicle track is moving backward.

As illustrated in FIGS. 2B and 2C, the longitudinal stiffness of the turning lugs 80 and the posts 115 helps the lateral ends of the propulsive lugs 70 resist longitudinal deformation under braking or propulsive loads while simultaneously allowing central, outward portions of the propulsive lugs 70 to deform longitudinally to some extent. As the endless track 30 moves forward or backward, snow exerts a longitudinal load on one of the sides 90, 100 of the propulsive lugs 70. The longitudinal load bends the outer, central portions 117 of the propulsive lugs 70 into curves that bulge away from the direction of travel of the track 30. In FIG. 2B, the track 30 is moving forward (in the direction indicated by the arrow) while in FIG. 2C, the track 30 is moving in reverse (in the direction indicated by the arrow). In both the forward and reverse directions, the propulsive lugs 70 form cup shapes that grab snow to improve both braking and propulsive traction in the same manner as the previously-discussed V shaped lugs.

Figure 6:
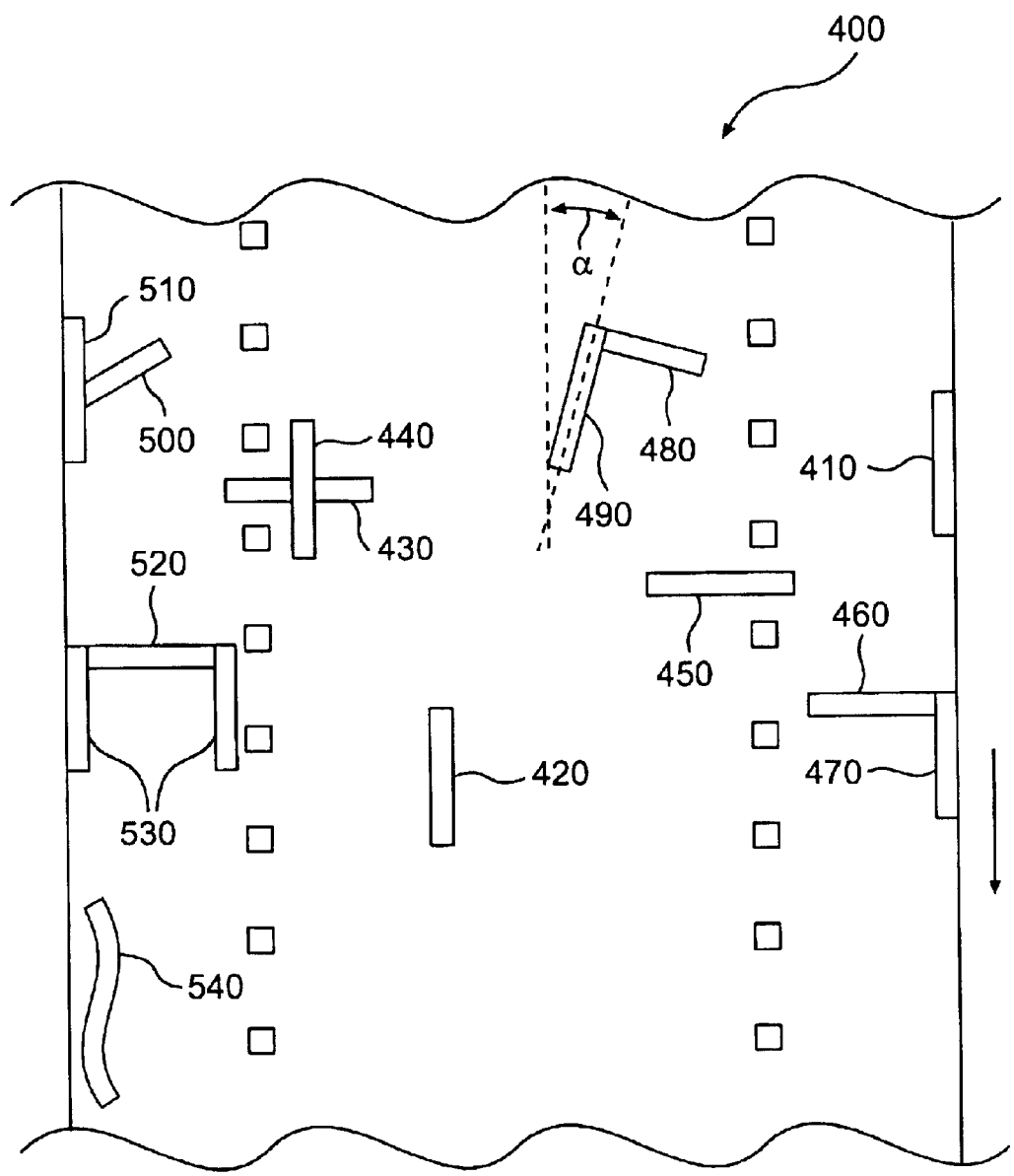
FIG. 6 is a partial bottom view of a vehicle track that includes both propulsive and turning lugs according to further additional embodiments of the present invention.

While the illustrated propulsive lugs 70 are connected to associated turning lugs 80 and posts 115 to improve braking and propulsive traction, the present invention also is intended to encompass embodiments where the lugs 70, 80 and posts 115 are distinct, unconnected structures (see, e.g., FIG. 6). Furthermore, the posts 115 may be eliminated altogether without departing from the scope of the present invention.

Where the lugs 70, 80 form T-shaped structures, the lugs 70, 80 and the posts 115 are preferably integrally formed with each other as well as with the endless belt of the track 30. As would be appreciated by those skilled in the art, however, the lugs 70, 80 need not be integrally formed with one another or with the track 30. Instead, they may be connected to one another or the track 30 by any suitable connection, such as a fastener or an adhesive.

The turning lugs 80 preferably comprise a resilient, flexible material such as rubber reinforced with fabric and/or metal. Accordingly, as illustrated in FIG. 3, when the turning lugs 80 are subjected to lateral loads, they flex laterally such that the side surfaces 110 form laterally facing ramps that urge the track 30 upwardly away from the snow. This operation facilitates turning of the track 30.

While FIG. 2A illustrates only two turning lugs 80, it is to be understood that a plurality of longitudinally spaced turning lugs 80 may be disposed on the track 30, as is generally illustrated in FIG. 1. The turning lugs 80 illustrated in FIGS. 1 and 2 are laterally and longitudinally spaced apart. As best seen in FIG. 2A, each turning lug 80 is aligned with an outer lateral edge of the track 30. However, the lugs 80 alternatively may be positioned at lateral positions intermediate to the lateral edges of the track 30.

During use of the snowmobile 10, the ramps formed by the side surfaces 110 of the turning lugs 80 help the track 30 and snowmobile 10 to turn. Endless tracks such as the track 30 typically contact the snow over extended longitudinal lengths of 1 to 2 meters. When the operator attempts to steer the snowmobile 10 and urge the snowmobile 10 to pivot about a generally vertically extending axis, the longitudinally-elongated track 30 tends to resist the pivotal movement. Because the propulsive lugs 70 are specifically designed to dig into the snow, the lugs 70 impede the steering movement of the track 30 and compound the steering problem already created by the longitudinally elongated ground contact.

The turning lugs 80 improve the ability of the track 30 to pivot during steering by reducing the digging traction of the propulsive lugs 70. As the skis 20 urge the track 30 to turn, the snow exerts a lateral force on the turning lugs 80, which flexes the lugs 80, causing the side surfaces 110 to form ramps (see FIG. 3). The lateral force thereafter urges the track 30 upwardly along the ramps away from the snow. The upward movement of the track 30 partially disengages the lugs 70, 80 from the snow, which enhances the ability of the track 30 to pivot.

The turning lugs 80 also preferably include side surfaces 120 that are positioned on an opposite lateral side of the turning lugs 80 from the side surfaces 110. The side surfaces 120 function in the same manner as the side surfaces 110 when the track 30 is exposed to lateral forces in an opposite direction from the lateral forces exerted on the side surfaces 110.

The turning lugs 80 also help to prevent the snowmobile 10 from lurching sideways as the snowmobile 10 makes tight turns. In tight turns, high lateral loads are exerted on the lugs 70 by the snow, which may cause the snowmobile 10 to lurch sideways. However, during such tight turns, the turning lugs 80 partially disengage the lugs 70 from the snow to reduce the amount of lateral force that can be transmitted from the snow to the snowmobile 10 through the lugs 70. Accordingly, the lugs 80 help the snowmobile to slide sideways as the track 30 is pushed upwardly away from the snow.

Figure 4:
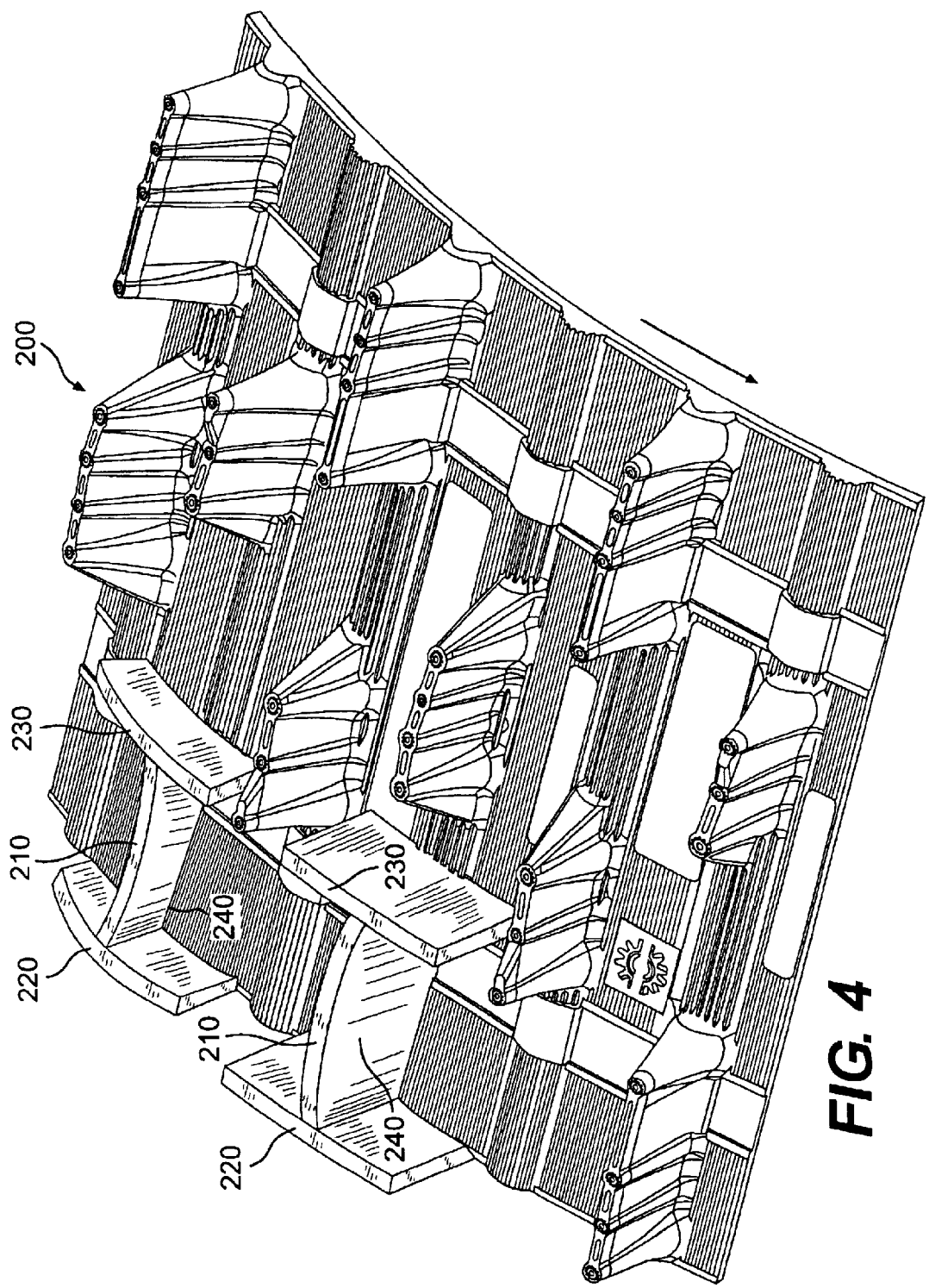
FIG. 4 is a partial perspective view, taken from the bottom, left, rearward side, of a vehicle track according to an additional embodiment of the present invention.

FIG. 4 illustrates an alternative track 200, which may be used on the snowmobile 10. The track 200 includes a propulsive lug 210 and a turning lug 220 that together form a T shape. However, in this embodiment, an additional turning lug 230 is provided on an opposite side of the propulsive lug 210 from the turning lug 220. Together, the lugs 210, 220, 230 generally form an H shape.

In addition to enhancing steerability, the turning lugs 220, 230 also enhance propulsive and braking traction. During forward movement, the forward face 240 of the propulsive lug 210 and the forward halves of the turning lugs 220, 230 combine to form a cup shape that scoops snow to improve propulsive traction. The cup shape functions in a similar manner as the V shape of the propulsive lugs disclosed in U.S. Pat. No. 5,713,645. For the same reason, the H shape of the lugs 210, 220, 230 also advantageously enhances braking traction and propulsive traction of the snowmobile 10 when in reverse.

Figure 5:
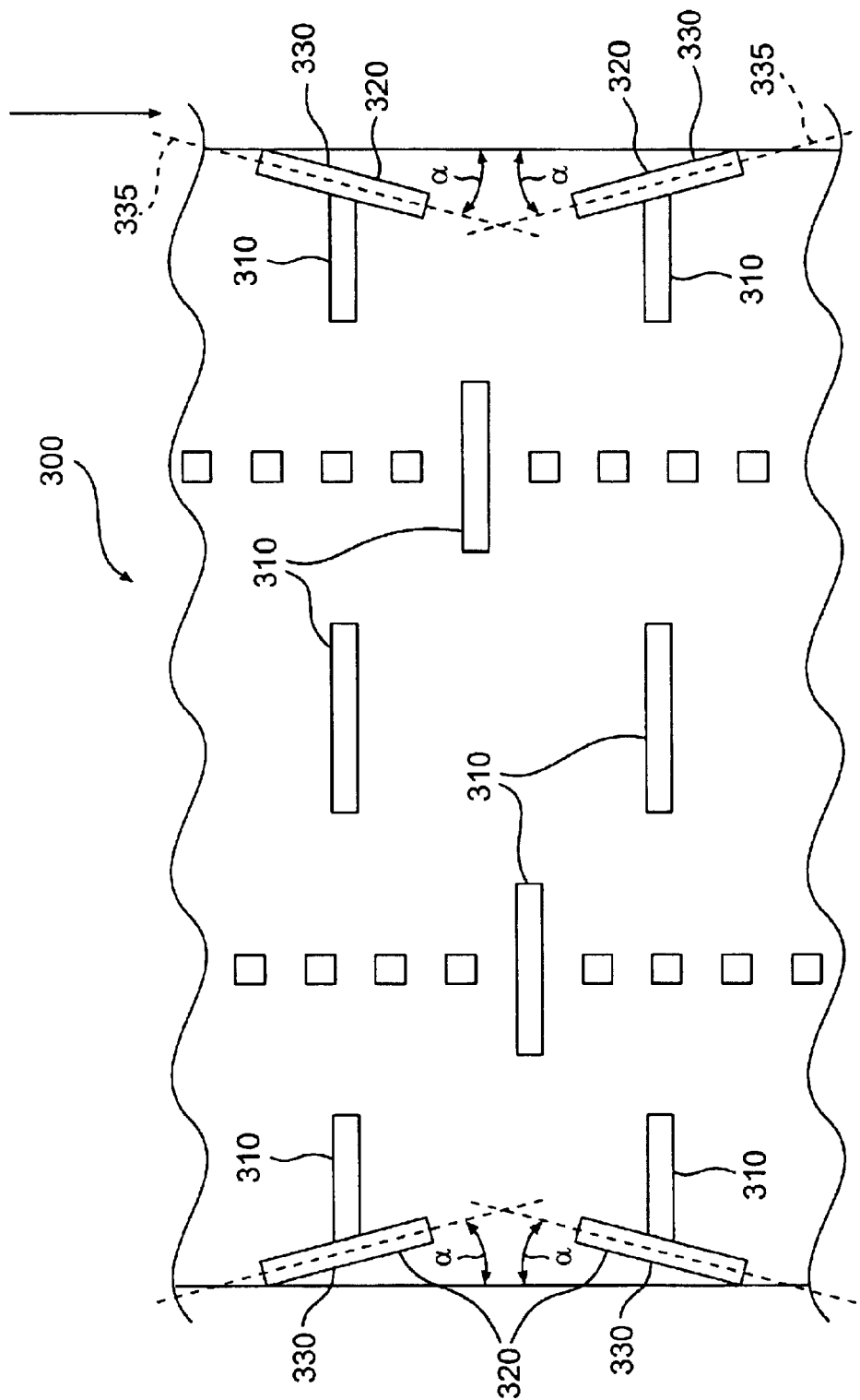
FIG. 5 is a partial bottom view of a vehicle track according to a further additional embodiment of the present invention.

FIG. 5 illustrates a partial bottom view of a track 300, which is a further alternative embodiment of the present invention. The track 300 includes a plurality of laterally-elongated propulsive lugs 310 and longitudinally-elongated turning lugs 320, which are generally similar to the previously described propulsive and turning lugs 70, 80. As with the track 30, several of the propulsive lugs 310 are connected to several of the turning lugs 320 to create generally T-shaped lugs.

The track 300 differs from the track 30, however, in that the turning lugs 320 are not generally parallel to the longitudinal direction of the track 300. Instead, as viewed from below, a lug axis 335 of the turning lugs 320 form angles α relative to the longitudinal direction of the track 300. The angle α is preferably relatively small such that the longitudinal component (i.e., the longitudinal length of the laterally facing component) of the side surface 330 of each turning lug 320 is substantially larger than its respective lateral component (i.e., the lateral length of the longitudinally facing component). Consequently, the side surface 330 extends in the longitudinal direction further than the side surface 330 extends in the lateral direction. The longitudinal component of the side surface 330 is preferably at least twice as large as its lateral component. The longitudinal component of the side surface 330 is preferably greater than 2 centimeters, more preferably greater than 3 centimeters, is more preferably greater than 5 centimeters, and is even more preferably greater than 10 centimeters. Similarly, the angle α is preferably less than 45 degrees and is more preferably less than 40 degrees such that the longitudinal component is larger than the lateral component. The angle α may be even smaller. For example, the angle α may be less than 35 degrees, less than 30 degrees, less than 25 degrees, less than 20 degrees, less than 15 degrees, less than 10 degrees, or even less than 5 degrees. As would be appreciated by those skilled in the art, in view of the foregoing discussion, the present invention is intended to encompass any particular orientation of the side surfaces 330 from 0 degrees to 45 degrees. As a result, if the side surfaces were oriented at 27.72 degrees, for example, it is intended that this angular orientation fall within the scope of the invention. Moreover, the angle α need not be the same for every side surface 330 on the track 30. It is contemplated that the angle α may vary between different side surfaces 330 without departing from the scope of the invention.

Because the longitudinal components of the side surfaces 330 are substantially larger than the lateral components of the side surfaces 330, the side surfaces 330 of the turning lugs 320 can still effectively bend in a lateral direction to provide laterally-facing ramps that improve track 300 steerability. As shown in FIG. 5, the turning lugs 320 may extend laterally inwardly and/or outwardly as they extend forwardly on the track 300.

While the turning lugs 320 extend in a generally constant longitudinal and lateral directions, the turning lugs 320 could alternatively be curved or angled (see, e.g., the turning lug 540 in FIG. 6). If the turning lugs are curved or angled, the lug axis extends in a linear direction that is defined by an average of the longitudinal and lateral components of the turning lug in a plane that is parallel to the outer side of the endless track.

Figure 10:
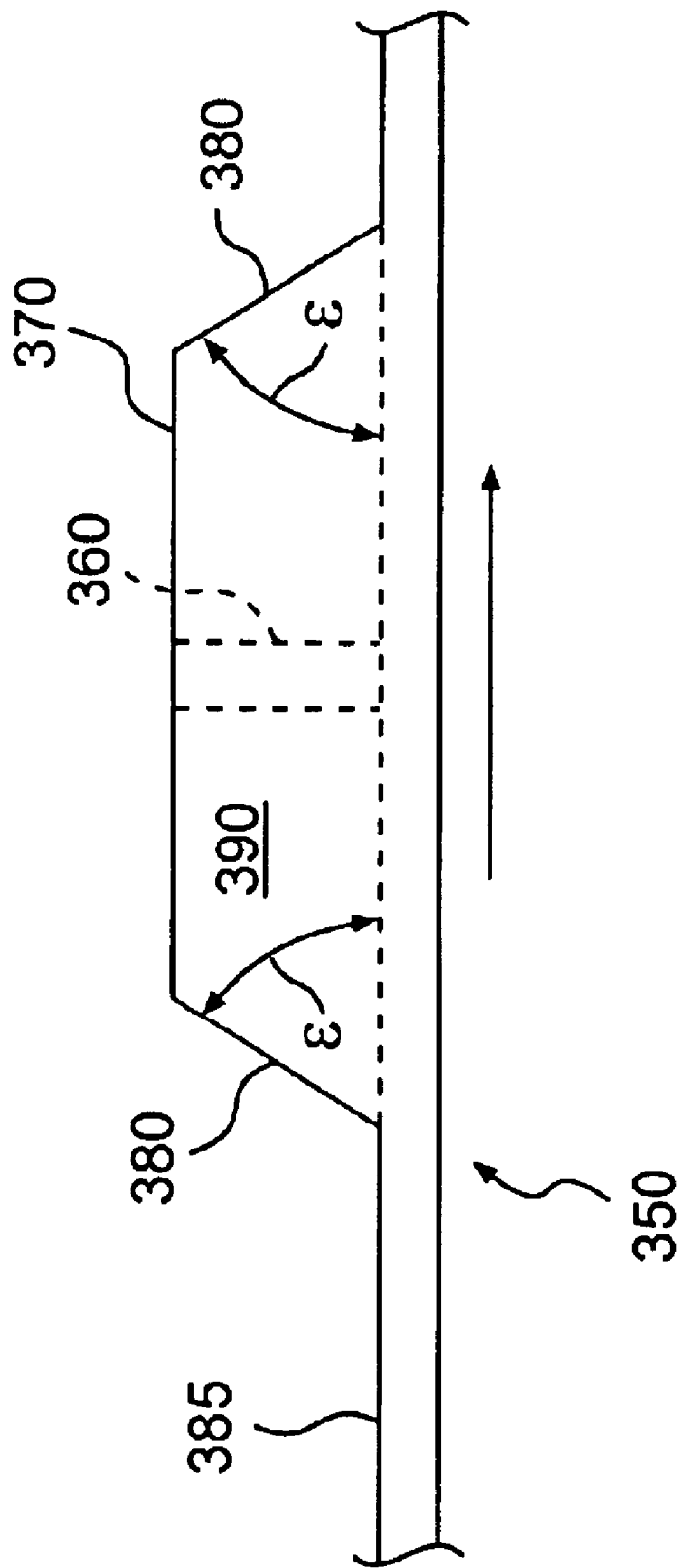
FIG. 10 is a partial side view of a vehicle track according to a further additional embodiment of the present invention.

Because the longitudinal ends of the turning lugs 320 extend straight away from the outer side of the track 300 (i.e., in a direction perpendicular to the outer side of the track 300), the longitudinal component of each side surface 330 is the same at a base portion of each turning lug 320 and at an outer portion of the turning lug. However, the longitudinal lugs 320 could alternatively taper longitudinally as they extend outwardly from the track 300. For example, FIG. 10 illustrates an additional track 350 according to an alternative embodiment of the present invention. The track 350 is similar to the track 30 illustrated in FIGS. 1–3 because propulsion lugs 360 and turning lugs 370 form T shapes. The turning lugs 370 differ from the previously described turning lugs 80, 220, 320 in that the turning lugs 370 taper longitudinally as they extend outwardly away from the track 350. Consequently, forward and rearward longitudinal ends 380 of the turning lugs 370 form acute angles ε with an outer side 385 of the track 350. Accordingly, a longitudinal component of a side surface 390 of the turning lug 370 is greater in its base portion than in its outer portion. While the longitudinal turning lugs 370 taper longitudinally at a constant rate, the rate of taper could vary such that the longitudinal ends 380 are curved or angular. Unless otherwise expressly stated, the general terms longitudinal component and longitudinal length are intended to comprise the largest longitudinal component of an identified structure. For example, the longitudinal length of the side surface 390 of the turning lug 370 comprises the larger longitudinal length at the base portion of the turning lug 370.

The propulsive lugs and turning lugs according to the present invention may take a variety of additional alternative shapes, orientations, and sizes. FIG. 6 illustrates a track 400, which is a further alternative embodiment of the present invention. As described below, the track 400 includes a variety of alternatively shaped and positioned propulsive lugs and turning lugs. As with the previously described lugs, the lugs preferably comprise a resilient material and may have a generally constant thickness.

A turning lug 410 is disposed on one lateral side of the track 400 and is not connected to any other propulsive or turning lug. A turning lug 420 is disposed in a middle portion of the track 400 and is not connected to any other lug. A propulsive lug 430 and a turning lug 440 are connected together to generally form a plus sign. A propulsive lug 450 is not connected to any other lug. A propulsive lug 460 and a turning lug 470 are connected together to form an L shape. A propulsive lug 480 and a turning lug 490 are connected together to form a generally L shape that is skewed by the angle α from being aligned with the longitudinal and lateral directions of the track 400. A propulsive lug 500 and a turning lug 510 are connected together to form a generally T shape with the propulsive lug 500 being somewhat skewed relative to the lateral direction of the track 400. A propulsive lug 520 and two turning lugs 530 generally form a C or U shape. A turning lug 540 includes a somewhat S-shaped compound curvature.

It should be noted that any one or more of the previously described propulsive lugs or turning lugs may be duplicated to form a repeating pattern on the outer side of an endless track. Accordingly, while a plurality of different embodiments of the propulsive lugs 430, 450, 460, 480, 500, 520 and turning lugs 410, 420, 440, 470, 490, 510, 530, 540 are illustrated on the track 400, any one of the illustrated lugs may, itself, form the basis of an entire set of lugs for an endless track.

Figure 7:
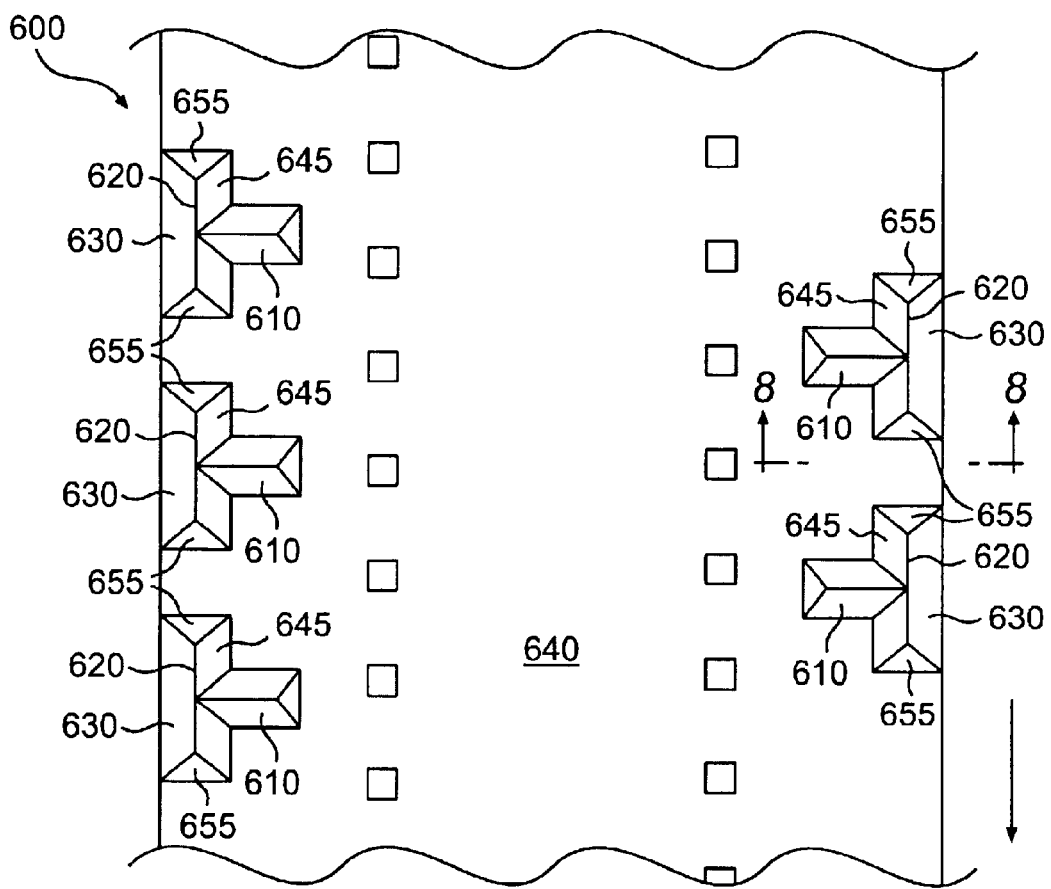
FIG. 7 is a partial bottom view of a vehicle track according to a further additional embodiment of the present invention.
Figure 8:
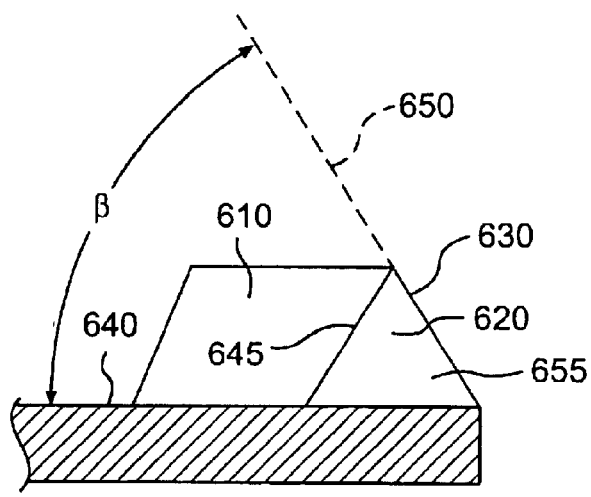
FIG. 8 is a partial longitudinal cross-sectional view, taken along the line 8—8 in FIG. 7, of the vehicle track illustrated in FIG. 7.

FIGS. 7 and 8 illustrate a track 600 that provides a further alternative embodiment of the present invention. Like the previous embodiments, the track 500 includes propulsive lugs 610 and turning lugs 620. As best illustrated in the cross-sectional view in FIG. 8, each turning lug 620 has a tapering thickness. The turning lug 620 has a longitudinally-elongated side surface 630. The side surface 630 angles laterally inwardly toward a lateral center of the track 600 as the side surface 630 extends outwardly away from the outer side 640 of the track 600. Similarly, the turning lug 620 has a longitudinally-elongated side surface 645 that extends laterally outwardly away from the lateral center of the track 600 as the side surface 645 extends outwardly away from the outer side 640. The side surfaces 630, 645 are generally planar. However, the side surfaces 630, 645 may alternatively include convex portions, concave portions, and/or other surface variations.

As can be seen in FIG. 8, the side surface 630 of the turning lug 620 defines a side surface axis 650 that extends along the side surface 630 in a plane that is perpendicular to the longitudinal direction of the track 600. The side surface axis 650 and the outer side 640 of the track 600 form an angle β. The angle β is preferably acute and may be less than 80 degrees. The angle β may alternatively be less than 70 degrees. The angle β may also be less than 60 degrees or less than 50 degrees. Accordingly, the side surface 630 forms a permanent ramp for the turning lug 620. The side surface 645 forms a similar ramp on the opposite side of the lug 630. Because the lug 630 does not have to bend laterally to form a ramp, the turning lug 620 can comprise a relatively stiff material, which may be significantly stiffer than the propulsive lugs 610.

Longitudinal end surfaces 655 of the turning lugs 620 also angle toward each other such that the turning lugs 620 generally resemble elongated pyramids. It is also contemplated that the end surfaces 655 could alternatively project straight away from the outer side 640 of the track 600 without departing from the scope of the present invention.

While the illustrated side surfaces 630, 645 are generally planar, the side surfaces 630, 645 may alternatively include curves, convexes, and angles. If the side surfaces 630, 645 are not planar, their side surface axes are defined by an average of their laterally and outwardly extending components, as would be appreciated by one of ordinary skill in the art.

In the embodiment illustrated in FIGS. 7 and 8, the side surface 630 is disposed at and aligns with an outer lateral edge of the track 600. Alternatively, the side surfaces may be disposed at any other location on the track 600.

The turning lugs 620 function in generally the same manner as the previously described flexible turning lugs, except that the side surfaces 630 of the turning lugs 620 form lateral ramps even when lateral loads are not exerted on the lugs 620. When the snowmobile 10 is steered to the left or right, lateral forces acting on the ramps formed by one or more of the side surfaces 630, 645 push the track 600 upwardly away from the snow to partially disengage the lugs 610, 620 from the snow and enhance the steerability of the track 600.

Figure 9:
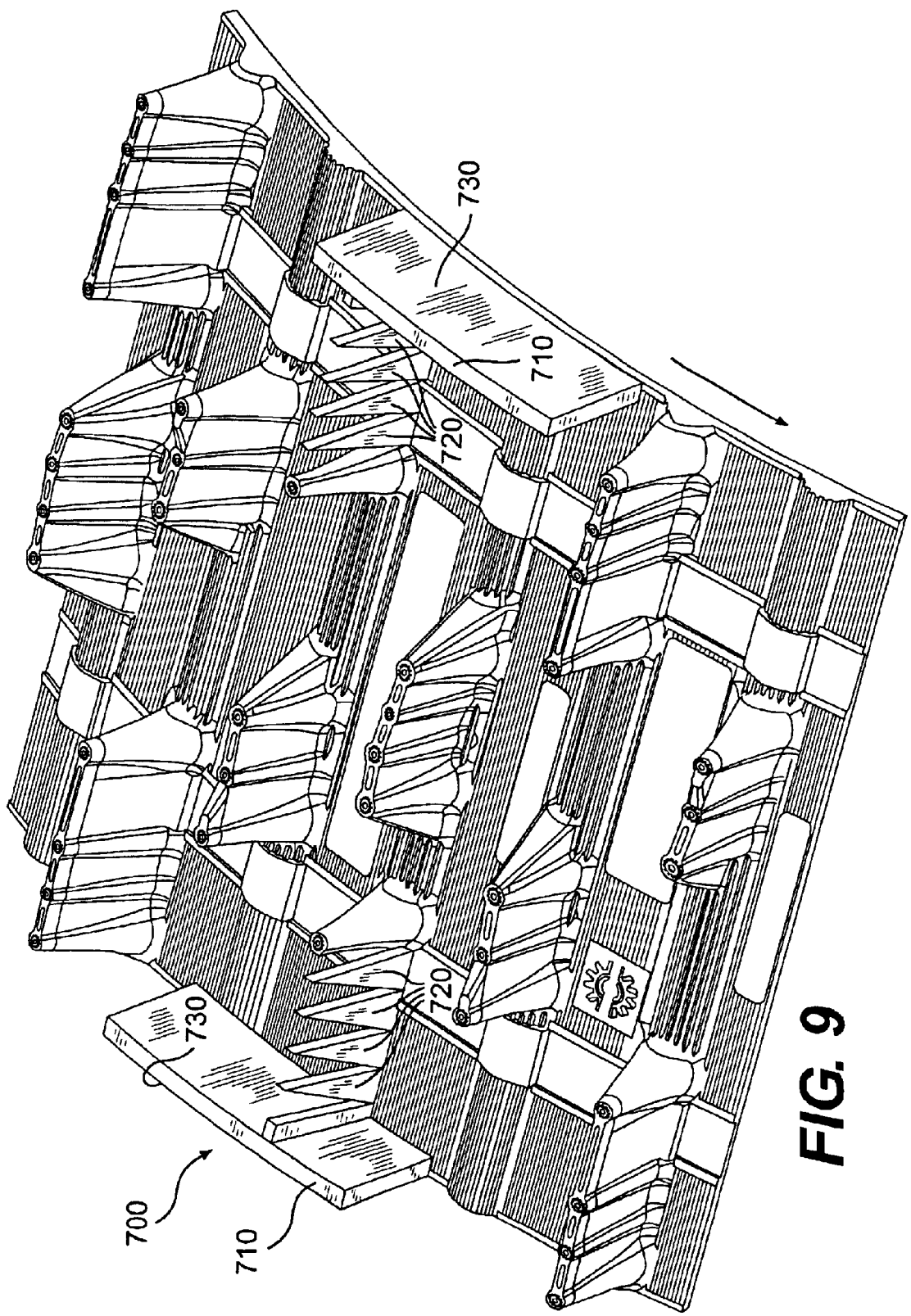
FIG. 9 is a partial bottom view of a vehicle track according to a further additional embodiment of the present invention.

FIG. 9 illustrates a track 700 according to a further alternative embodiment of the present invention. The track 700 includes a plurality of longitudinally elongated turning lugs 710. A set of wedge-shaped propulsive lugs 720 are laterally aligned with each other. Each propulsive lug 720 tapers laterally as it extends away from the track 700. Each set of propulsive lugs 720 may alternatively be constructed as a single propulsive lug with wedge or teeth shaped notches cut out of it. An end propulsive lug 720 of each set of propulsive lugs 720 is connected to a middle longitudinal portion of a turning lug 710 such that the turning lug 710 and an associated set of propulsive lugs 720 form a generally T shape. When a lateral load is exerted on a side surface 730 of the turning lug 710, the turning lug 710 bends laterally toward its respective set of propulsive lugs 720. The propulsive lugs 720 bend laterally along with the turning lug 710 until adjacent lateral sides of adjacent propulsive lugs 720 contact each other, at which point the propulsive lugs 720 form a partially pie-shaped solid lug that resists further lateral deformation. The shapes of the wedges of the propulsive lugs 720 are designed such that they form the solid lug shape when the turning lug 710 has bent laterally to a sufficient degree that the side surface 730 forms a ramp, as in the previous embodiments.

Figure 11:
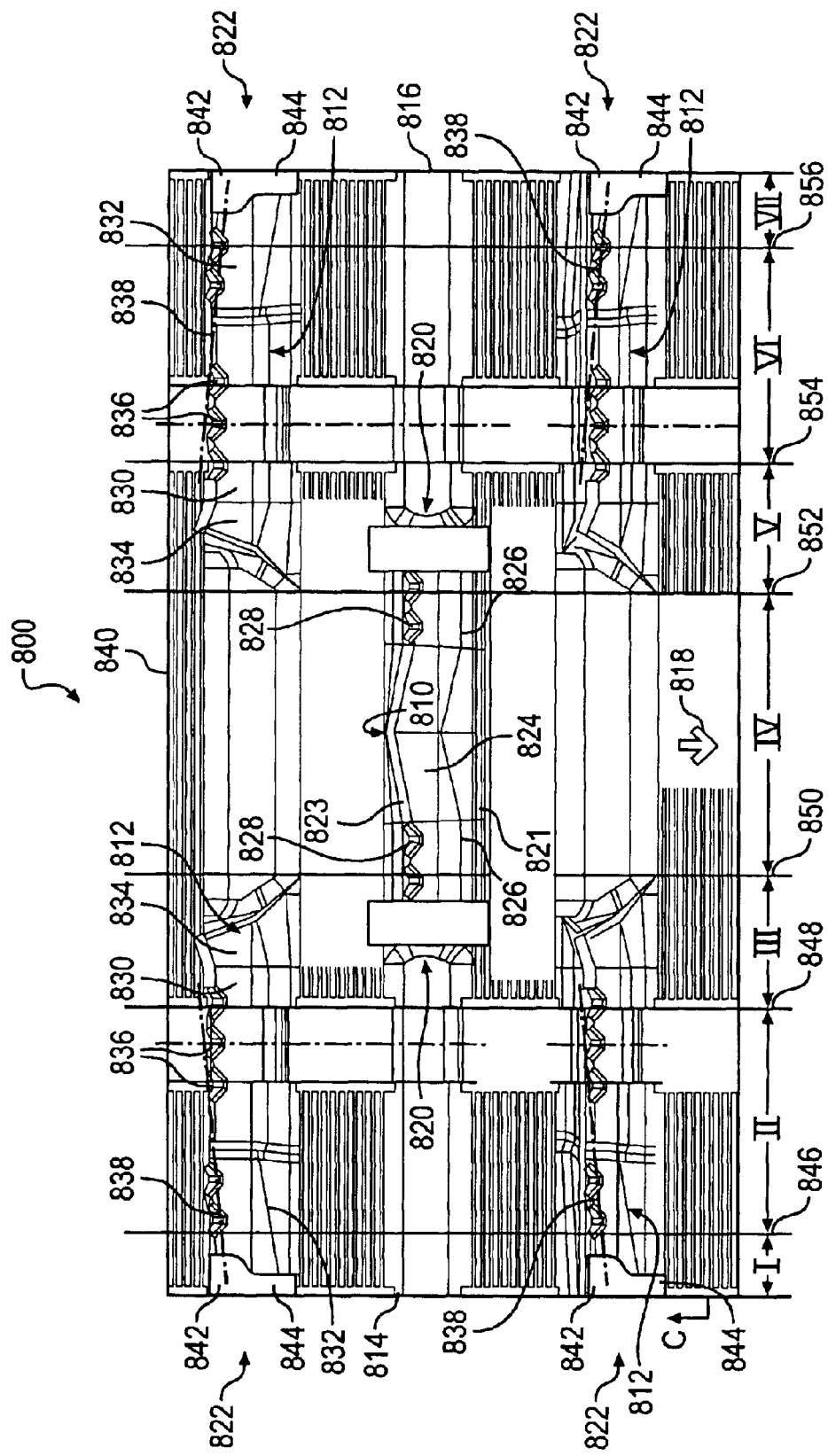
FIG. 11 is a bottom plan view of a vehicle track according to another embodiment of the present invention.

FIG. 11 illustrates a track 800 according to still another embodiment of the present invention. The track 800 includes a plurality of propulsive lugs 810, 812 and a plurality of turning lugs 820, 822. As in previous embodiments, the turning lugs 820, 822 are integrally formed with the propulsive lugs 810, 812.

In this embodiment, there are two types of propulsive lugs 810, 812 and two types of turning lugs 820, 822. The propulsive lugs 810, 812 and turning lugs 820, 822 operate in a manner consistent with the previously-described embodiments.

The propulsive lugs 810 are positioned at a position other than at one of either of the edges 814, 816 of the track 800. In this embodiment, the propulsive lugs 810 are disposed on the track in a direction perpendicular to the travel direction 818 of the track 800. The propulsive lugs 810 are tapered from a wider base portion 821 to a top portion 823. A central area 824 is V-shaped. The central area 824 is flanked on either side by straight portions 826. The straight portions 826 are provided with notches 828.

The propulsive lugs 812 are disposed so that one end extends to either of the edges 814, 816 of the track 800. These propulsive lugs 812 have a straight portion 830 sandwiched between two slightly angled portions 832, 834, as illustrated. The propulsive lugs 812 include notches 836, which are similar to the notches 828 in the propulsive lugs 810.

As illustrated in FIG. 11, the propulsive lugs 812 have a centerline 838 that generally defines the lateral direction in which the lugs 812 are disposed on the track 800. As shown, the centerlines 838 of the propulsive lugs 812 are disposed at a slight angle to a line 840 extending laterally across the track 800 in a direction perpendicular to the travel direction 818 of the track 800.

The propulsive lugs 812 are provided with turning lugs 822 at the ends adjacent to the lateral edges 814, 816 of the track 800. As illustrated in FIG. 11, the turning lugs 822 each have a thickened portion 842 and a narrowed portion 844. The thickened portions 842 are disposed adjacent one of the edges 814, 816 of the track 800 at respective lateral ends of the propulsive lugs 812. The narrowed portions 844 extend from the thickened portions 842 in the travel direction 818 of the track 800. In the embodiment illustrated, the narrowed portions 844 extend longitudinally along the edges 814, 816 of the track 800.

The propulsive lugs 810 include turning lugs 820, which are provided at either end thereof. The turning lugs 820 preferably are integrally molded with the propulsive lugs 810. As illustrated, the turning lugs 820 and the propulsive lugs 810 generally form an H shape.

As shown in FIG. 11, it is preferred that the track 800 be constructed so that there are repeating pairs of rows of propulsive lugs 810, 812 and turning lugs 820, 822. In other words, the track 800 has a repeating pattern of propulsive lugs 810, 812 and turning lugs 820, 822 as shown and described herein. The repeating pattern includes two rows of lugs. In the first row, there is a single propulsive lug 810 disposed at the center of the track. The propulsive lug 810 has turning lugs 820 positioned at either later end thereof. In the second row, there are two propulsive lugs 812 disposed adjacent the side edges 814, 816 of the track. The propulsive lugs 812 include turning lugs 822 at the lateral ends thereof, adjacent to the sides 814, 816 of the track. These first and second rows define a pair of rows which is successively repeated to form the length of the track 800.

It is a further feature of the track 800 that the hardness of the track 800 varies from lateral edge 814 to lateral edge 816. In particular, it is preferred for the turning lugs 820, 822 to be rigid enough to act as ramps and not bend easily when the track 800 operates in a propulsive mode. It is also preferred that the propulsive lugs 810, 812 be soft enough to flex when turning. To accomplish this, the track has a variable hardness from edge 814 to edge 816. The turning lugs 820, 822 are constructed of a harder material than the propulsive lugs 810, 812.

The track 800 is divided into seven separate regions, I–VII, from the first lateral edge 814 to the second lateral edge 816. Each of the regions I–VII are shown in FIG. 11. Dividing lines 846, 848, 850, 852, 854, 856 are also illustrated in FIG. 11 to indicate the approximate transition points from region I to region VII from the first lateral edge 814 to the second lateral edge 816 of the track 800. As would be appreciated by those skilled in the art, the dividing lines 846–856 provide an indication of the general location at which a transition is made from one region to the next and are not meant to be exact.

As indicated in the figure, the hardness of the rubber differs from one region of the track to another. Specifically, when measured with a durometer, regions I, III, V, and VII have a DURO Shore A hardness by ASTM D2240 standards of about 80±10. Regions II, IV, and VI have a DURO Shore A hardness by ASTM D2240 standards of about 50±10. While these hardnesses are preferred, it should be noted that other materials with differing durometer readings may be employed without departing from the scope of the present invention.

While the vehicle tracks 30, 200, 300, 400, 600, 700, 800 have been illustrated and described as snowmobile tracks, the present invention is not limited to snowmobile tracks. Rather, the present invention is considered applicable to the endless tracks used on all types of tracked vehicles. For example, the turning lug ramp principle use in the tracks 30, 200, 300, 400, 600, 700, 800 is equally applicable to the tracks of a snow groomer equipped with turning lugs. When a snow groomer attempts to steer by having one lateral track move faster than the opposing lateral track, the propulsive lugs tend to cause the tracks to resist the pivotal steering movement. However, the ramps on the turning lugs partially disengage the propulsion and turning lugs from the snow to enhance the snow groomer's ability to turn.

Furthermore, the turning lugs may also be used to enhance steerability on surfaces other than snow. For example, the turning lugs may be used on the tracks of tracked vehicles to improve steerability on surfaces such as dirt, sand, mud, etc.

The foregoing illustrated embodiments are provided to illustrate the structural and functional principles of the present invention and are not intended to be limiting. To the contrary, the principles of the present invention are intended to encompass any and all changes, alterations and/or substitutions within the spirit and scope of the following claims. For example, the permanently ramped turning lugs 530 may replace any one or more of the flexible turning lugs 80, 220, 230, 320, 410, 420, 440, 470, 490, 510, 530, 540, 820, 822.

What is claimed is:

1. A vehicle track, comprising:
   an endless flexible belt having an outer side and an opposed inner side, the endless flexible belt being engagable with a propulsion system of a vehicle;
   at least one laterally-elongated propulsive lug projecting from the outer side of the endless belt to provide propulsive and braking traction for the vehicle track; and
   at least one turning lug projecting from the outer side of the endless belt, the at least one turning lug having a side surface that forms a ramp that urges the vehicle track to slide upwardly and laterally when subjected to a lateral load.

2. The vehicle track according to claim 1, wherein the side surface is disposed at an outer lateral portion the endless flexible belt.

3. The vehicle track according to claim 1, wherein the side surface is aligned with an outer lateral edge of the endless flexible belt.

4. The vehicle track according to claim 1, wherein the at least one turning lug comprises a flexible material such that when a lateral load is applied to the at least one turning lug, the at least one turning lug flexes laterally to form the ramp.

5. The vehicle track according to claim 4, wherein the side surface is one of an inside surface and an outside surface, and the turning lug can flex laterally to form the ramp on the one of the inside surface and the outside surface depending on a direction of the lateral load.

6. The vehicle track according to claim 1, wherein the at least one turning lug defines a lug axis that forms an angle of less than 45 degrees with a longitudinal direction of the endless belt.

7. The vehicle track according to claim 1, wherein the at least one propulsive lug farms an angle of less than 45 degrees with the lateral direction of the endless belt.

8. The vehicle track according to claim 1, wherein the at feast one propulsive lug is connected to the at least one turning lug.

9. The vehicle track according to claim 8, wherein the at least one propulsive lug and the at least one turning lug generally form a T shape.

10. The vehicle track according to claim 9, wherein the at least one turning lug comprises first and second turning lugs, and the first and second turning lugs are connected to opposite lateral sides of the at least one propulsive lug generally to form an H shape.

11. The vehicle track according to claim 8, wherein the at least one propulsive lug and the at least one turning lug generally form an L shape.

12. The vehicle track according to claim 11, further comprising a second turning lug, the second turning lug being connected to the at least one propulsive lug away from the at least one turning lug to generally form a C shape.

13. The vehicle track according to claim 11, wherein the side surface of the at least one turning lug is generally planar.

14. The vehicle track according to claim 1, wherein the side surface of the at least one turning lug generally angles toward a center of the vehicle track.

15. The vehicle track according to claim 1, wherein the side surface of the at least one turning lug defines a side surface axis that is disposed at an angle of less than 90 degrees from the outer side of the endless belt.

16. The vehicle track according to claim 1, wherein the at least one turning lug comprises a plurality of turning lugs that are longitudinally spaced from each other over the longitudinal length of the outer side of the endless flexible belt.

17. The vehicle track according to claim 1, wherein the at least one turning lug comprises first and second sets of turning lugs, each of the sets comprise a plurality of turning lugs that are longitudinally spaced from each other over a longitudinal length of the endless flexible belt, and the first and second sets of turning lugs are laterally offset from each other.

18. The vehicle track according to claim 17, wherein the first and second sets of turning lugs are disposed on opposite lateral sides of the endless flexible belt from each other.

19. The vehicle track according to claim 18, wherein each of the turning lugs has an inside surface and an outside surface, the ramp being formed on the outside surface of at least one lug of the first set of turning lugs and the inside surface of at least one lug of the second set of tuning lugs.

20. The vehicle track according to claim 1, wherein the endless flexible belt is constructed with regions of variable hardness between opposing lateral edges.

21. The vehicle track according to claim 20, wherein the endless flexible belt has a first region with a first hardness associated with the propulsive lug and a second region with a second hardness associated with the turning lug.

22. The vehicle track according to claim 21, wherein the second hardness is greater than the first hardness.

23. A snowmobile in combination with the vehicle track according to claim 1, the snowmobile comprising:

a frame;

a straddle seat supported by the frame;

a suspension system supported by the frame, the vehicle track being operatively supported by the suspension system;

a propulsion system operatively connected to the vehicle track; and two front steerable skis supported by the frame.

24. The vehicle track according to claim 1, wherein the at least one turning lug is longitudinally-elongated along the endless belt.

* * * * *